Oct. 9, 1973  D. H. THOW  3,764,390

ELECTRICAL THERMAL CELLS

Filed May 30, 1972

United States Patent Office 3,764,390
Patented Oct. 9, 1973

3,764,390
ELECTRICAL THERMAL CELLS
David Henry Thow, Glasgow, Scotland, assignor to Mine Safety Appliances Company Limited, Glasgow, Scotland
Filed May 30, 1972, Ser. No. 258,733
Int. Cl. H01m 21/14
U.S. Cl. 136—83 T                                  2 Claims

ABSTRACT OF THE DISCLOSURE

The invention consists of an electrical thermal cell having a housing containing a cathode and anode connected to terminals mounted on the housing. Sandwiched between the anode and the cathode is an electrolyte which is solid at normal temperatures and which activates the cell when molten. A layer of Thermite is disposed within the housing.

The housing has an opening which is closed by a seal formed of a substance which melts or ruptures when subject to the action of external gases at a temperature which will ignite the Thermite. When this occurs the said gases will ignite the Thermite and this initiates the activation of the cell.

---

This invention has reference to electrical thermal cells.

An electrical thermal cell comprises essentially a cathode and an anode with a solid electrolyte sandwiched therebetween and housed in a container, the cathode and anode being electrically connected to terminals carried by the container. The cell remains inactive until the electrolyte is heated and heretofore this has been done by means of Thermite ignited by closing an electric circuit or mechanically activating a percussion device. Such cells may be activated by accidentally completing the circuit or by accidentally operating the percussion device.

The present invention has for its object to provide an electrical thermal cell which cannot be accidentally activated.

According to the present invention an electrical thermal cell comprising a housing containing a cathode and anode with a solid electrolyte therebetween, the cathode and anode being electrically connected to terminals mounted on the housing, and at least one layer of Thermite or other substance which, when ignited, will generate sufficient heat to melt the electrolyte is characterized in that at least part of the housing will melt or rupture when subjected to the action of external gases at a temperature which will ignite the Thermite or other layer, said gases when the housing or part thereof is melted or ruptured then igniting the Thermite or other layer to initiate the activation of the cell.

Preferably the housing is provided with an opening closed by a seal or plug which melts or ruptures when subjected to the action of external gases at a temperature which ignites the Thermite or other layer.

Figure 1:
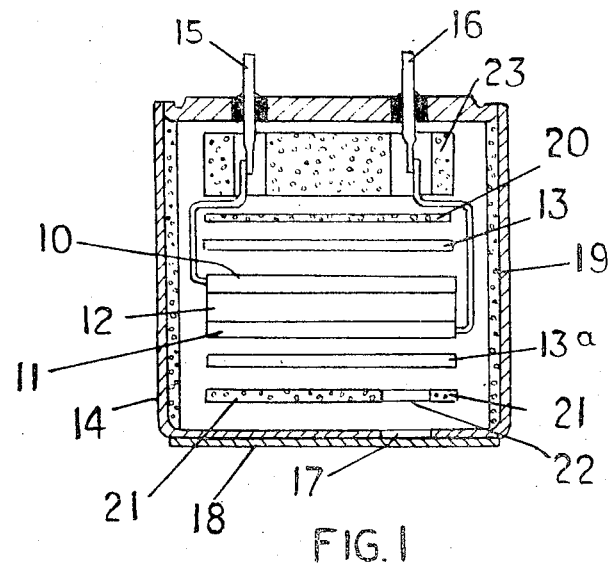
Figure 2:
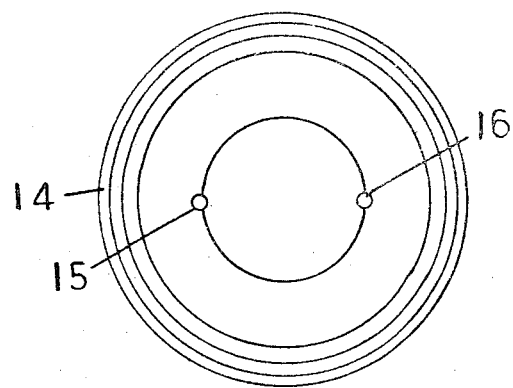

A preferred embodiment of the invention will now be described with reference to the accompanying drawings wherein:

FIG. 1 is a diagrammatic sectional elevation of the electrical thermal cell, and FIG. 2 is a plan view thereof.

As shown in the drawings the electrical cell has an anode 10 in the form of a metal disc and a cathode 11 in the form of a metal disc or casing, a solid electrolyte 12 sandwiched between the cathode and the anode, a layer of Thermite 13 above the anode and a second layer of Thermite 13a below the cathode, the whole being housed in a container 14 the top cover of which carries terminals 15 and 16 electrically connected to the anode and cathode. The electrical connections of the terminals to the cathode and anode are sealed within an insulating body 23.

The container 14 is preferably cylindrical as shown and the base thereof or the wall thereof has a port 17 therein which is normally sealed by means of a cover 18 which has a lower melting point or is thinner than the walls of the container. The cover may extend over the base of the container.

The wall of the container has a heat insulating liner 19, a heat insulating disc 20 is provided above the Thermite layer 13 and a similar disc 21 is provided below the Thermite layer 13a. The insulating disc 21 has an aperture 22 directly above the port 17.

When the container is subjected to external gases at a temperature which melts or ruptures the cover 18 the port 17 is no longer sealed and the gases pass therethrough and ignite the Thermite. The heat generated by the Thermite melts the electrolyte 12 and thus activates the cell.

According to a modification the port 17 is sealed by means of a plug which has a lower melting point than the container but will melt at a temperature necessary to ignite the Thermite.

In a further construction the base of the container is such that it will melt when subjected to the temperature at which the Thermite is ignited.

Or the container may be formed of a plastics material which will melt when subjected to a temperature at which the Thermite ignites. In such construction means are provided to hold the cathode and anode in spaced relationship when the cell is activated.

The seal may be such that its melting point is higher than the temperature which ignites the Thermite in case the seal is ruptured by the combined action of the heat and the pressure of the external gases. Where reliance is made on the seal rupturing it should be of such thickness or is so weakened that it ruptures when subjected to the pressure of external gases at the temperature which will ignite the Thermite.

It wil be appreciated that in all such constructions the cell cannot be accidentally activated. It can be activated only when surrounded by gases at a temperature which melts or ruptures the seal or part of the container and thereafter ignites the Thermite.

A plurality of such cells may be electrically connected to form a battery.

What is claimed is:

1. An electrical thermal cell comprising a housing containing a cathode and anode with a solid electrolyte therebetween, the cathode and anode being electrically connected to terminals mounted on the housing, and at least one layer of a substance which, when ignited, will generate sufficient heat to melt the electrolyte, at least part of the housing being such as will melt or rupture when subjected to the action of external gases at a temperature which will ignite the said layer, said gases then igniting the said layer to initiate the activation of the cell.

2. An electrical thermal cell as claimed in claim 1 wherein the housing has an opening closed by a seal or plug which melts or ruptures when subjected to the action of external gases at a temperature which ignites the Thermite or other layer.

References Cited
UNITED STATES PATENTS 3,625,767   12/1971   Clark et al. _____ 136—83 T
3,677,822   7/1972    Bush _____ 136—83 T ANTHONY SKAPARS, Primary Examiner